United States Patent [19]

Foladare et al.

[11] Patent Number: 5,742,906
[45] Date of Patent: Apr. 21, 1998

[54] INTELLIGENT PBX IN-BUILDING AND OUT-OF-BUILDING PERSONAL REACH COMMUNICATIONS SYSTEM

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corp., Middletown, N.J.

[21] Appl. No.: 668,659

[22] Filed: Jun. 25, 1996

[51] Int. Cl.[6] .................................................. H04Q 7/20
[52] U.S. Cl. .................. 455/461; 455/31.2; 340/825.44
[58] Field of Search .................. 379/57, 56; 340/825.44; 455/38.1, 461, 31.2, 413

[56] References Cited

U.S. PATENT DOCUMENTS

| | | | |
|---|---|---|---|
| 4,642,425 | 2/1987 | Guinn, Jr. et al. | 455/31.2 |
| 5,109,400 | 4/1992 | Patsiokas et al. | 455/413 |
| 5,166,973 | 11/1992 | Hoff | 455/31.2 |
| 5,369,681 | 11/1994 | Boudreau et al. | 340/825.44 |
| 5,375,162 | 12/1994 | Kim et al. | 455/31.2 |
| 5,428,663 | 6/1995 | Grimes et al. | 455/31.2 |
| 5,608,782 | 3/1997 | Carlsen et al. | 455/461 |

Primary Examiner—William Cumming
Assistant Examiner—Myron K. Wyche
Attorney, Agent, or Firm—Stephen M. Gurey

[57] ABSTRACT

A call placed by a calling party from within the local office or campus area served by an intelligent PBX of a called party who is a subscriber to a personal reach service is held at that PBX for determination of whether the called party/subscriber is within or outside the local area served by the PBX. This determination is made using two-way paging technology through which a pager-carrying called party/subscriber is determined to be within the local area if the two-way pager carried by the called party/subscriber is registered within the area. If the called party/subscriber is determined to be within the local area, then a local page is broadcast to the called party/subscriber and a return call to the PBX by the called party/subscriber is bridged with the call being held from the calling party at the PBX. If the called party/subscriber is determined to be outside the local area, then the calling party's call is connected over the telephone network to the called party/subscriber's personal reach service network platform. A nationwide page is broadcast and a return call from the called party/subscriber to the network platform is bridged with the calling party's call to complete the connection between the calling and called parties.

14 Claims, 4 Drawing Sheets

INTELLIGENT PBX IN-BUILDING AND OUT-OF-BUILDING PERSONAL REACH COMMUNICATIONS SYSTEM

CROSS REFERENCE TO RELATED APPLICATIONS

This application relates to subject matter described in U.S. patent application No. 8/590,237, filed Jan. 23, 1996, for M. J. Foladare, S. B. Goldman, D. P. Silverman, and R. P. Weber, co-inventors herein, and assigned to the assignee hereof, and entitled "Personal Mobile Communications System With Two Points of Entry"; and in U.S. patent application Ser. No. 08/668,661, filed simultaneously herewith, for S. Bala, M. J. Foladare, S. B. Goldman, D. P. Silverman, and R. P. Weber, and assigned to the assignee hereof, and entitled "In-Building and Out-of-Building Personal Reach Communications System".

TECHNICAL FIELD

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In copending applications Ser. No. 08/316,613 and 08/497,060 Personal Reach Systems (PRS) are described in which a page to a subscriber is initiated in response to a telephone call from a caller to a subscriber's special personal reach telephone number, and the subscriber in response to the page places a telephone call, namely a "return telephone call" to a meet-me bridge of a bridging and signaling unit within a PRS network platform at which the caller's telephone call is held for connection to the return telephone call. Upon receipt of the return telephone call at the bridging and signaling unit, the caller's telephone call and the return telephone call are bridged, i.e., connected together at the meet-me bridge holding the caller's call, so that the caller and the called party may communicate.

SUMMARY OF THE INVENTION

In accordance with the invention, when a caller calling from within the local office or campus area served by an intelligent PBX of a called party/subscriber to a personal reach service attempts to reach that called party/subscriber either by dialing the subscriber's extension or by dialing the subscriber's special personal reach telephone number, the intelligent PBX first determines whether the subscriber is within the local area served by the PBX using, for example, two-way paging technology. If the called party/subscriber is determined not to be within the local area, then the PBX launches an outbound call over the public switched telephone network that connects the caller to the Personal Reach System network platform to which the called party is a subscriber. A return call by the called party/subscriber to the PRS network platform in response to a nationwide page launched by the platform is bridged to the caller, thereby connecting the caller and the called party. If the called party/subscriber is determined to be within the local PBX area, then a local page is initiated and a return call to the PBX from the called party/subscriber in response to the local page is bridged by the PBX to the caller's call, the latter remaining at the PBX rather than being connected to the PRS network platform.

DETAILED DESCRIPTION

Figure 1:
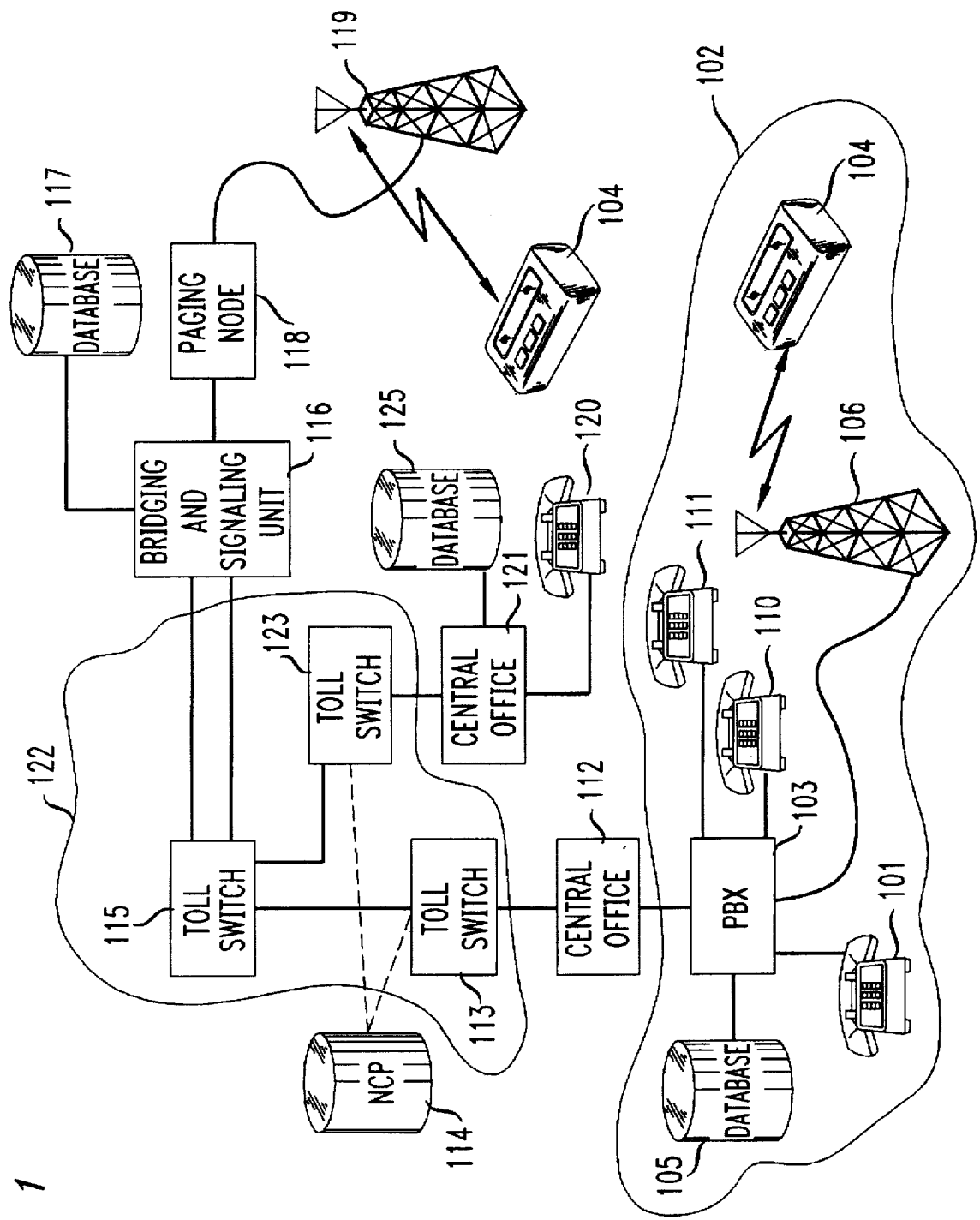
FIG. 1 is a block diagram of a telephone system incorporating a Personal Reach System and the present invention.

FIG. 1 shows an arrangement for providing telecommunications services in accordance with the present invention. A caller from within the local area 102 served by PBX 103 places a telephone call from the calling telephone 101, which is connected to PBX 103, to reach a subscriber to a personal reach telephone service whose home PBX is also PBX 103. That called party/subscriber is associated with a pager 104 that in the preferred embodiment described herein has two-way paging capabilities. The caller, in attempting to reach the called party/subscriber may dial either the local extension normally associated with that called party/subscriber, or may dial a number associated with the subscriber's personal reach service located on a network platform, which in a preferred embodiment is an 800 type of telephone number, but which is not required to be such a telephone number.

It is assumed initially that the caller from telephone 101 dials the local extension on PBX 103 of the called party/subscriber's telephone 110. Although shown as originating from within the PBX system, such call placed to the called party/subscriber's local extension could originate from a calling party outside the PBX system. In accordance with the present invention, PBX 103 is an intelligent PBX incorporating meet-me bridging capabilities for bridging a caller's call and a return call placed by a called party to PBX 103 in response to a page that signals the called party that a personal reach telephone call is waiting. PBX 103 also has signal processing capabilities. A custom programmed Intuity™ based PBX available from Lucent Technologies could be used as PBX 103. In accordance with the invention, PBX 103, upon receiving a call directed to a called party/subscriber associated with the PBX, determines whether at that time the called party/subscriber is within or outside its local serving area 102. In addition, PBX 103 directs and processes an incoming telephone call in accordance with the number or extension dialed. Specifically, as will be described hereinafter, in response to the extension dialed by the caller at telephone 101, PBX 103 determines whether or not the called party associated with that extension is in fact a subscriber to a personal reach telephone service. Such determination is made by accessing a record associated with the extension of telephone 110 in a database 105. If the called party is a subscriber and if the called party is determined to be within local area 102, then PBX 103 rings the called party's local telephone 110 extension and/or initiates a local page within the local office or campus area 102 through local paging tower 106 to the subscriber's pager 104. The signal sent by PBX 103 to paging tower 106 identifies the frequency and capcode of the two-way pager 104 carried by the called party/subscriber. Such identifying information is retrieved from the called party/subscriber's record in database 105 by PBX 103 in accordance with the called party/subscriber's dialed local extension. From any telephone, such as 111, from within the local area 102, the called party/subscriber may thereupon place, a return call into PBX 103. Such call can be to a special extension assigned to the subscriber, which identifies the subscriber and associates the return call with the waiting call for the called party/subscriber. Alternatively, the called party/subscriber may dial a extension commonly used for return calls by all personal reach subscribers associated with PBX 103. Upon answer, the subscriber thereupon enters a personal identification code via a sequence of touch-tone inputs. From this ID code, stored in database 105, PBX 103 is able to associate the return call with the waiting call from the calling party on telephone 101. Upon associating the return call via telephone 111 within the local area and the waiting call from telephone 101, PBX 103 bridges the two calls together and completes the connection between the calling and called parties locally within the environment of PBX 103.

As noted, PBX 103 may ring the called party's local telephone extension of telephone 110 on PBX 103, or any other predetermined telephone number, if at the time of the call the called party/subscriber is determined to be within local area 102. Such ringing can be effected either prior to initiating the local page to the called party/subscriber, or contemporaneously therewith. Thus, if the called party is determined to within area 102, an initial attempt to reach the called party at his or her extension and thus usual "domicile" within-the office or campus environment, minimizes the use of the bridging and paging equipment associated with PBX 103, thereby freeing such facilities to handle other calls for other called parties/subscribers within area 102.

In the preferred embodiment of the present invention, the determination of whether the called party/subscriber is within or outside local area 102 is made using two-way paging technology, which is well known in the art. In accordance with such well known paging technology, the pager 104 associated with a called party/subscriber can be determined to be registered within the local area 102 by periodically transmitting a polling signal to the pager. The pager 102, if within the local area, detects the polling signal and automatically transmits a response signal which is received by transmitting tower 106, and processed by PBX 103, thereby identifying the pager 104 as being registered within area 102 of PBX 103. Alternatively, the pager 104 can be determined to be registered within local area 102 through the detection of a response that is automatically generated by the pager upon receipt of the paging signal transmitted by local tower 106, which is initiated by PBX 103 in response to the call to the called party/subscriber's local extension. In either case, if a response from pager 104 is not detected by PBX 103, then pager 104 is out of the range covered by the local paging system, and the called party/subscriber is determined to be outside the local office or campus environment 102 serviced by PBX 103. If PBX 103 determines that pager 104 is in fact registered, then the called party/subscriber is within the office or campus environment 102 serviced by the PBX.

If upon receiving a call for called party/subscriber, PBX 103 determines that the called party/subscriber is not within the local office or campus environment 102, then database 105 is accessed to retrieve the personal reach telephone number of that called party/subscriber's Personal Reach System network platform in order to initiate a nationwide page. Thus the retrieved 800-type of number personal reach telephone number of the called party/subscriber is out-dialed by PBX 103, passing the call through the central office 112 to associated toll switch 113 on the inter-exchange network 122. Network Control Point (NCP) database 114 translates the dialed 800-type of telephone number into a destination number to route the call through toll switch 115 to bridging and signaling unit 116 of the PRS network platform. Bridging and signaling unit 116 in turn retrieves from its associated database 117 the necessary paging information for the called party/subscriber, determined by the number out-dialed by PBX 103 to reach the PRS network platform. This paging information, as in the local situation described above, includes the frequency and capcode that uniquely identifies the called party/subscriber's pager 104, which paging information is retrieved from database 117 from the called party/subscriber's identity. In a preferred embodiment, the capcode and frequency used for the nationwide page may be different than that used for the local page due to the different frequency bandwidths that might be available for nationwide and local paging purposes. Pagers with the capability of operating at different frequencies and different capcodes are known in the art. As shown in FIG. 1, the same pager 104 is shown as being both within the local area 102 of PBX 103 or outside the local area 102 to illustrate both alternative locations of a called party/subscriber. For the nationwide page, paging node 118 initiates the broadcast of a paging signal containing the paging information from paging tower 119.

Upon detection of the nationwide paging signal, pager 104 alerts the called party/subscriber carrying the pager. In response to being alerted by the nationwide page, the subscriber places a return call from the nearest telephone station 120 to a particular predetermined telephone number if he or she desires to respond to the call. Central office 121 receives the return call and routes it to toll switch 123 within the inter-exchange network 122.

The telephone number of the return telephone call is translatable, i.e., a database lookup is performed to determine the routing telephone number to which the call is actually completed. For example, the return telephone call is placed to an 800-type of telephone number. Thus, NCP database 114 translates the dialed 800-type of telephone number into a destination number to route the return call to the bridging and signaling unit 116. An advantage of using an 800-type of telephone number for the return call is that the called party/subscriber holding pager 104 can place the return telephone call without needing to have any information about the area code of the telephone line being used. A database 125, associated with central office 121, provides routing information of the return call to the proper inter-exchange carrier.

The subscriber's return telephone call routed to bridging and signaling unit 116 is bridged by a meet-me type of bridge (not shown) within unit 116 with the call from telephone 101 that has been routed from PBX 103. Bridging of the return call of the subscriber to the originating call of the caller is effected by associating the telephone number of the called party as out-dialed by PBX to reach the Personal Reach Service network platform with the telephone number dialed by the subscriber in placing the return telephone call from telephone 120. Specifically, the PRS telephone number out-dialed by PBX 103 is forwarded by the inter-exchange network over a signaling channel to bridging and signaling unit 116. Alternatively, such number may be obtained by bridging and signaling unit 116 using in-band or out-of-band signaling. Database 127 includes a record that also associates a subscriber's called number with a return telephone number. By properly associating the telephone number dialed by the subscriber in placing the return call from telephone 120, with the number out-dialed by PBX 103 as per the record in database 127, bridging and signaling unit 116 effects the bridging together of the return call and the calling party's call.

If the called party/subscriber fails to respond to the nationwide page, then the calling party's call is directed to a voice-mailbox associated with the subscriber so that a message may be left for the subscriber's later retrieval.

In the discussion of the invention heretofore, it has been assumed that the calling party from telephone 101 dialed the called party/subscriber's local extension. The calling party from telephone 101 may alternatively attempt to reach the subscriber by directly dialing the called party/subscriber's personal reach telephone number using, as afore-described, that subscriber's 800-type of personal reach telephone number. In the event that the calling party from telephone 101 dials the called party/subscriber's 800-type of PRS number, PBX 103, by accessing database 105, associates that dialed number with one of its local subscribers. PBX 103 thereupon determines whether that called party/subscriber is at that time within the local office or campus environment 102 in the same manner previously described. It the called party/subscriber is determined to be within area 102, then PBX 103, rather than out-dialing the dialed 800 PRS number, launches a local page within area 102 to the subscriber's pager 103, while ringing the local extension of the subscriber's telephone 110 or any other predetermined number associated with the subscriber. Then, as previously described, if the called party/subscriber responds to the page with a return call, the calling party's call and the return call are bridged together within PBX, without a connection ever needing to be established to the dialed PRS network platform.

If the called party/subscriber is determined to outside the office or campus environment 102, then the nationwide 800 PRS number dialed by the calling party is out-dialed by PBX 103 to the bridging and signaling unit 116 and a nationwide page is initiated in the manner previously described.

Figure 2:
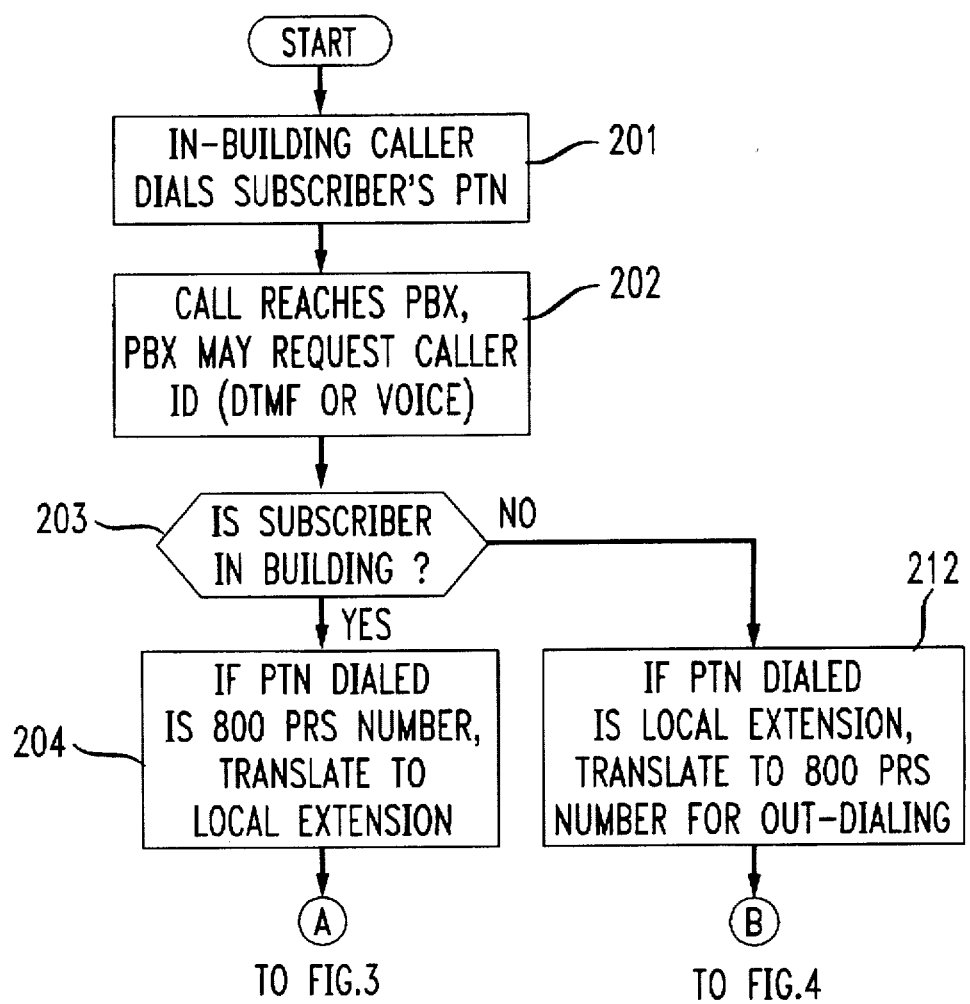
FIGS. 2, 3, and 4 together show an illustrative call-flow diagram of the steps of the present invention.
Figure 3:
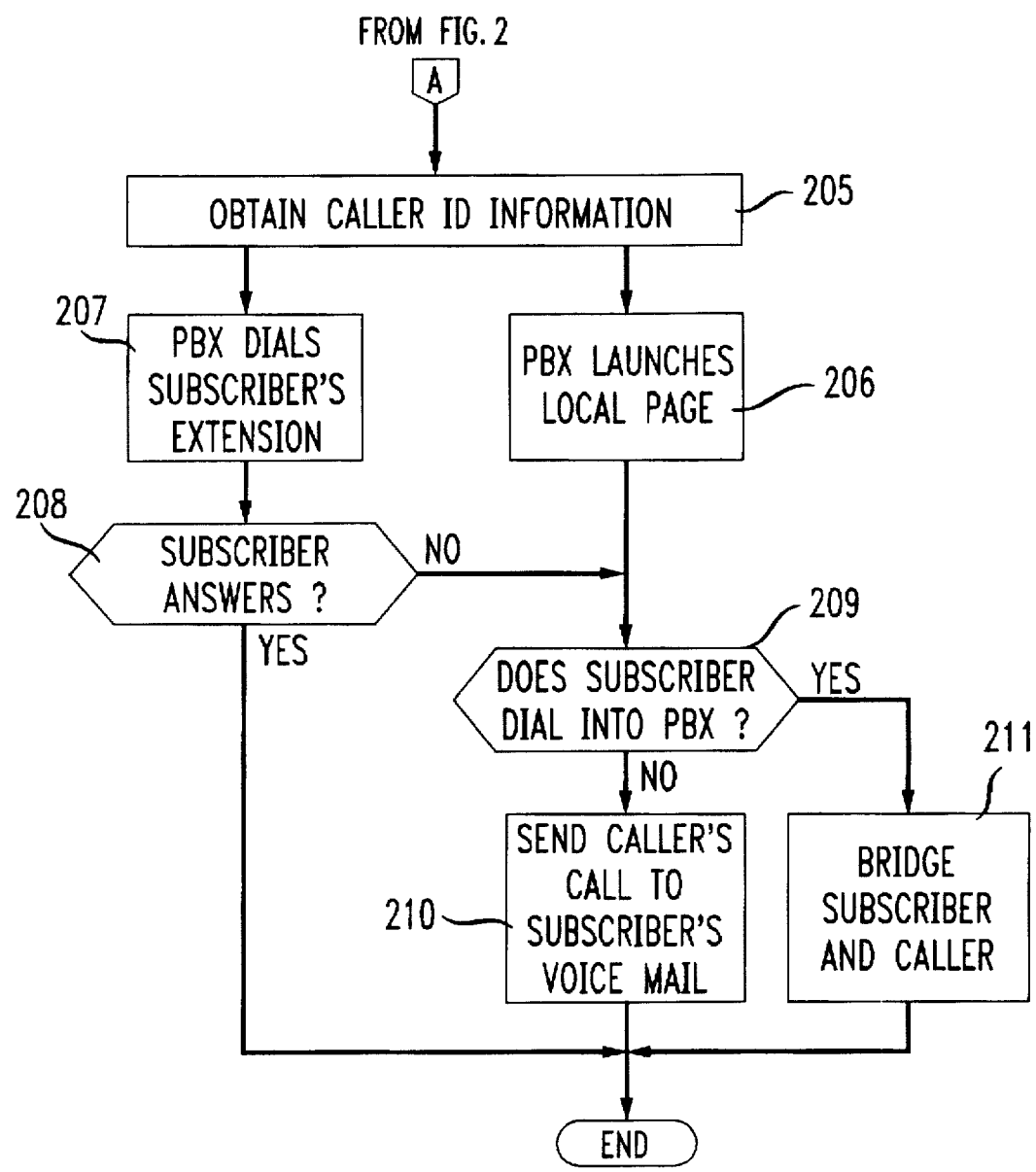
Figure 4:
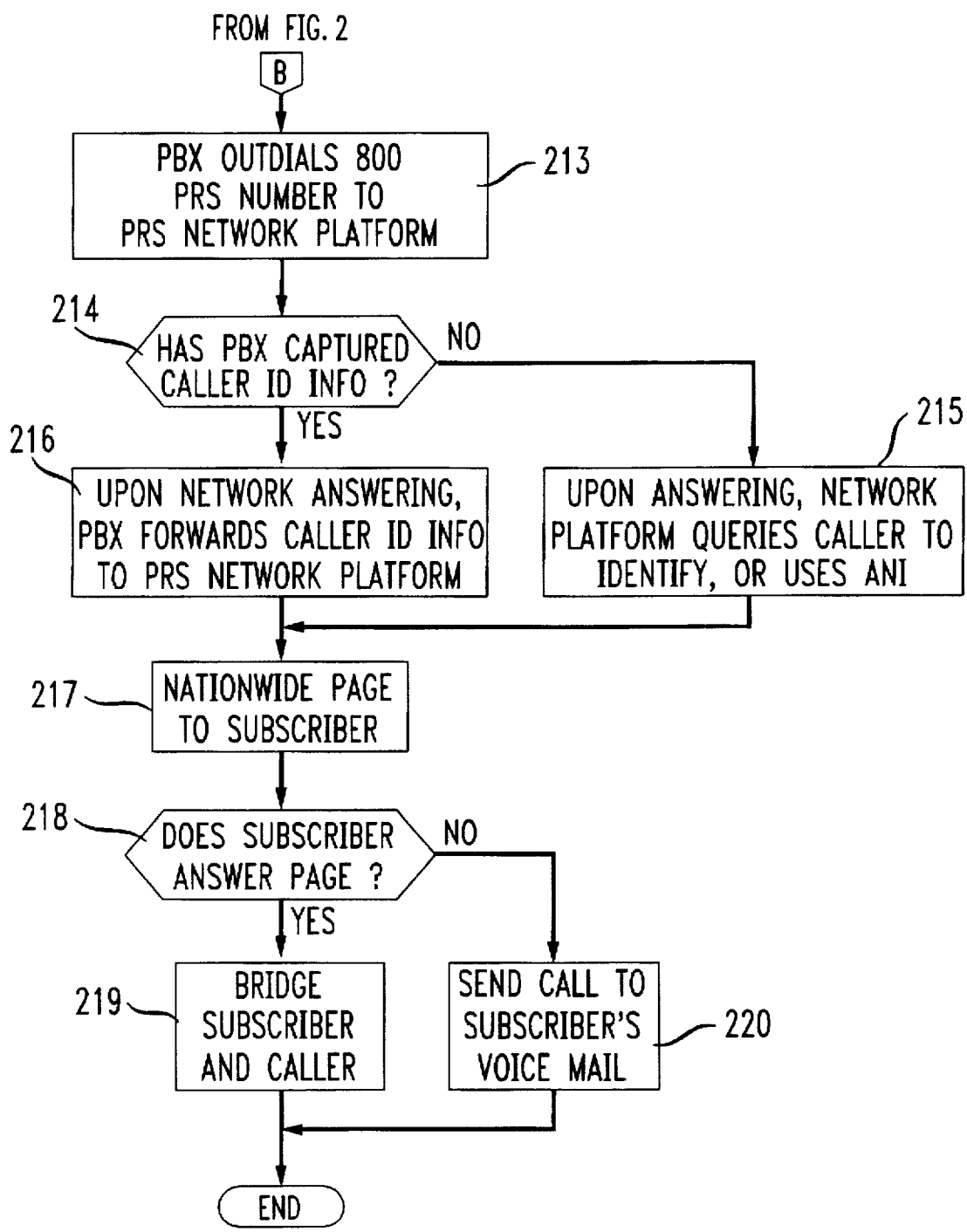

The flow charts in FIGS. 2, 3 and 4 together show the call flow process of establishing a connection between a calling party and a called party/subscriber in a Personal Reach System in accordance with the present invention. At step 201 the in-building (or on campus) caller dials the called party/subscriber's Personal Telephone Number (PTN), which can either be the called party/subscriber's local extension or his or her 800-type PRS telephone number. At step 202, the call reaches the PBX 103. The PBX may at that time request the called to identify him or herself. At step 203, the PBX determines whether the subscriber is in the building or within the local campus area. If determined to be within the building or campus environment, then at step 204, and if the PTN dialed is the called party/subscriber's 800-type PRS number, then the PTN is translated to a local extension. At step 205, if not already obtained in step 202, identification information is requested of the caller, which will be provided to the called party/subscriber with the page that signals a waiting call. At step 206, the PBX launches a local page, while in parallel at step 207, the PBX dials the subscriber's local extension. At step 208, if the called party/subscriber answers, the connection is completed. If the called party/subscriber does not answer the ringing local extension, then in response to the local page, the subscriber at step 209, either does of does not dial into the PBX. If yes, at step 210, the caller call and the called party/subscriber's return call are bridged together, thereby completing the connection. If the subscriber does not dial into the PBX in response to the page, then at step 211, the caller's call is sent to the subscriber's voicemail, which completes the call.

Returning to step 203, if the subscriber is determined to be outside the building or campus environment, then at step 212, if the PTN dialed by the caller is the called party/subscriber's local extension, then the PTN is translated to the called party/subscriber's 800-type of PRS telephone number. At step 213, the subscriber's 800-type of PRS telephone number is out-dialed over the inter-exchange network. At step 214, if the PBX has not captured the caller's identification, then at step 215, the network platform queries the caller for his or her identity, or in absence of such information being provided, uses the caller's ANI as his or her identity. If the PBX captured the caller's identification information, then at step 216, that information is forwarded by the PBX to the PRS network platform. At step 217, a nationwide page is broadcast to the called party/subscriber. If, at step 218, the called party/subscriber answers the page, then at step 219 the called party/subscriber's return call and the calling party's call are bridged, thereby completing the connection. If the called party/subscriber does not answer the page at step 218, then at step 220, the calling party's call is sent to the subscriber's voicemail for later retrieval of a message by the subscriber.

In the embodiment of the present invention described hereinabove, two-way paging is the methodology used for determining whether a called party/subscriber is within the local area served by his or her "home" PBX. Other methods could also be used to determine whether the called party/subscriber is within the PBX's local area. For example, any methodology which requires the called party/subscriber to manually or automatically check into and out of a local area which registers the party as being within or outside the local area could be used. For example, in an office building environment in which employees register themselves by means of a smart-card upon their entry and exit through either a door or a parking garage could also be used, whereby the information associated with each employees entry and exit is passed from the smart-card system to the local PBX.

The above-described embodiment is illustrative of the principles of the present invention. Other embodiments could be devised by those skilled in the art without departing from the spirit and scope of the present invention.

The invention claimed is:

1. A method for use in completing a telephone call to a called party/subscriber to a personal reach telephone service placed by a calling party who is local to a home PBX associated with that called party/subscriber, the method comprising the steps of:

receiving the calling party's call at the home PBX;

determining whether the called party/subscriber is within an area local to the home PBX at the time the calling party's call is received at the home PBX;

if the called party/subscriber is determined to be within the area local to the home PBX and the calling party has dialed a personal reach telephone number associated with the called party/subscriber on the personal reach telephone service, converting the personal reach telephone number to a local extension number on the home PBX and initiating connection of the call from the PBX to the local extension number; and if the called party/subscriber is determined to be outside the area local to the home PBX and the calling party has dialed a local extension number associated with the called party/subscriber on the home PBX, converting the dialed local extension number to the personal reach telephone number associated with the called party/subscriber and initiating connection of the call from the PBX to the personal reach telephone number.

2. The method of claim 1 wherein the step of determining whether the called party/subscriber is within an area local to the home PBX comprises the step of using two-way paging technology to determine whether a pager associated with the called party/subscriber is within the area local to the home PBX.

3. The method of claim 1 further comprising the steps of:

if the called party/subscriber is determined to be within the area local to the home PBX and the calling party has dialed the called party/subscriber's personal reach telephone number, upon initiating connection of the call from the PBX to the local extension number also locally paging the called party/subscriber within the area local to the home PBX to alert the called party/subscriber that a telephone call is waiting;

if the called party is responsive to the local page, receiving a return telephone call from the called party/subscriber at the home PBX; and bridging together at the home PBX the telephone call from the calling party and the called party/subscriber's return telephone call.

4. The method of claim 1 further comprising the step of ringing a telephone at the called party/subscriber's local extension number on the local PBX if the called party/subscriber is determined to be within the area local to the home PBX and the calling party has dialed the personal reach telephone number.

5. The method of claim 1 further comprising the steps of:

if the called party/subscriber is determined to be outside the area local to the home PBX and the calling party has dialed the called party/subscriber's local extension number, completing connection of the call from the PBX to the personal reach telephone number to a personal reach system network platform associated with the called party/subscriber which has meet-me bridging capabilities; and initiating a nationwide page to the called party/subscriber.

6. The method of claim 5 further comprising the steps of:

if the called party is responsive to the nationwide page, receiving a return telephone call from the called party/subscriber at the personal reach system network platform; and bridging together the return call and the calling party's call at the personal reach system network platform.

7. The method of claim 2 wherein the step of determining whether the pager associated with the called party/subscriber is within an area local to the home PBX comprises the step of determining whether the pager is registered in the area local to the PBX.

8. The method of claim 3 further comprising the step of connecting the call from the calling party to a voice mailbox associated with the called party/subscriber if the called party/subscriber is not responsive to the local page within a predetermined time.

9. The method of claim 5 further comprising the step of connecting the call from the calling party to a voice mailbox associated with the called party/subscriber if the called party/subscriber is not responsive to the nationwide page with a predetermined time.

10. In a personal reach telephone system in which a call from a calling party to a called party/subscriber's Personal Reach Service (PRS) telephone number is bridged to a return call placed by the called party in response to a page to a pager associated with the called party which page indicates to the called party/subscriber that a call is waiting, a meet-me bridge being located in a network platform of the personal reach service telephone system associated with the called party/subscriber, the called party/subscriber also being associated with a home PBX having meet-me bridging capabilities, a method comprising the steps of:

receiving a call at the called party/subscriber's home PBX for the called party/subscriber from a calling party who is also local to the home PBX;

determining whether the called party/subscriber is within an area local to the home PBX when the call from the called party/subscriber is received;

if the called party/subscriber is determined to be within the area local to the home PBX and the calling party has dialed the called party/subscriber's PRS telephone number, converting the PRS telephone number to a local extension number on the home PBX associated with the called party/subscriber and initiating connection of the call from the PBX to the local extension number; and if the called party/subscriber is determined to be outside the area local to the home PBX and the calling party has dialed the called party/subscriber's local extension number on the home PBX, converting the dialed local extension number to the called party/subscriber's PRS number and initiating connection of the call from the PBX to the PRS number.

11. The method of claim 10 wherein the pager is a two-way pager and the step of determining whether the called party/subscriber is within an area local to the home PBX comprises the step of using two-way paging technology to determine whether the pager is within the area local to the home PBX.

12. The method of claim 10 further comprising the steps of:

if the called party/subscriber is determined to be within the area local to the home PBX and the calling party has dialed the called party/subscriber's PRS number, upon initiating connection of the call from the PBX to the local extension number also locally paging the called party/subscriber within the area local to the home PBX to alert the called party/subscriber that a telephone call is waiting;

if the called party is responsive to the local page, receiving a return telephone call from the called party/subscriber at the home PBX; and bridging together at the home PBX the telephone call from the calling party and the called party/subscriber's return telephone call.

13. The method of claim 10 further comprising the steps of:

if the called party/subscriber is determined to be outside the area local to the home PBX and the calling party has dialed the called party/subscriber's local extension number, completing connection of the call from the PBX to the called party/subscriber's PRS number to the network platform of the personal reach system associated with the called party/subscriber; and initiating a nationwide page to the called party/subscriber.

14. The method of claim 13 further comprising the steps of:

if the called party is responsive to the nationwide page, receiving a return telephone call from the called party/subscriber at the personal reach system network platform; and bridging together the return call and the calling party's call at the personal reach system network platform.

* * * * *